United States Patent Office

3,164,475
Patented Jan. 5, 1965

3,164,475
RICE PROCESS
James Taylor Willock, Solihull, England, assignor, by mesne assignments, to General Foods Corporation, White Plains, N.Y., a corporation of Delaware
No Drawing. Filed Nov. 29, 1961, Ser. No. 155,797
5 Claims. (Cl. 99—80)

The present invention relates to improvements in the modification of rice products which are suitable for use in the preparation of rice puddings. More particularly, the invention relates to the production of a rice product suitable for use in the preparation of rice puddings wherein the rice grains are physically modified to increase their porosity whereby the cooking period necessary for the preparation of rice puddings can be shortened.

Heretofore, prior art quick-cooking rice products suitable for use as a rehydrated vegetable rice grain have not been completely satisfactory for use in rice puddings. The rice grains which have been processed so as to render them quick-cooking do not withstand the type of cooking required for the preparation of rice puddings.

It is an object of the present invention to prepare a dehydrated rice product which is eminently suitable for use in the preparation of a rice pudding. A further object of the present invention is to prepare a dehydrated rice product which can be used in the preparation of a rice pudding wherein the cooking time may be shortened.

It has now been discovered that the objects of the present invention may be obtained by treating milled rice grains to raise the moisture content uniformly throughout the grains to about 18% to 30% and thereafter heating the grains to effect a modification of their structure by rapid expulsion of the moisture. Preferably, the moisture content of the rice grains is raised to about 22% to 28% prior to heating.

By following the foregoing procedure, the rice grains are not substantially altered in size, but by the effect of heat and moisture their porosity is increased and they are fissured so as to allow rapid penetration of liquid, e.g. milk, and to liberate starch to effect thickening when cooked in the liquid. Accordingly, they will more rapidly be cooked to provide a rice pudding of desirable characteristics. During the heat treatment the moisture content is reduced to below 14% by weight, preferably 10 to 14% which is substantially the equilibrium moisture content for keeping. The combined effect of the heat and moisture in the process may effect a slight gelatinzation of the starch content of the rice grains which is desirable, but too much gelatinization of the starch, such as may be brought about by higher moisture contents of the rice before heating, is undesirable in that the rice when cooked into a pudding has not the desirable tenderness and thickening qualities with milk.

Various procedures may be adopted to achieve the desired increase in the moisture content of the milled rice. For example, milled rice grains may be soaked in or sprayed with water at a temperature below the gelatinization point of the starch content thereof, e.g. 30 minutes at 20° C. or 10 minutes at 55°–60° C., followed by removal of surface moisture, for example by centrifuging and conditioning of the treated grains to ensure substantially uniform distribution of moisture therethrough.

The conditioning of the treated grains produced by the foregoing treatment with water may be effected by holding them at a temperature below the gelatinization point of the starch content thereof in a closed space or in a current of air having a controlled humidity until the moisture is substantially uniformly distributed therethrough, e.g. 30 minutes to 4 hours at 20° C., in a closed space or 10 minutes in a current of air having a relative humidity of 80–90% at a temperature of 55° C. When the technique of spraying the grains with water is employed, it is preferred that the rice grains are agitated so as to ensure substantially uniform distribution of the water throughout the grains.

An alternative method of achieving the desired moisture content according to the invention involves treating milled rice grains with air at a temperature and at a humidity such that the grains absorb the required amount of moisture. When operating in this manner there is no substantial amount of surface moisture on the grains, and, furthermore, the distribution of the moisture throughout the grains is substantially uniform and does not in all instances necessitate the adoption of the above-mentioned conditioning treatment.

The final stage of heating the treated grains is preferably effected by passing a stream of air or gas at a temperature of 90° C. to 120° C. over and/or through the treated grains for a period ranging from 2 to 6 minutes depending upon the temperature of the stream of air or gas, the lower time of treatment, of course, being employed at the higher temperatures.

According to an important feature of the invention, the heating is preferably effected by placing the treated grains with their increased moisture content as a shallow bed on a conveyor belt which is permeable to air, the conveyor belt traversing a zone in which the heated air or gas is blown upwardly through the conveyor belt and through the bed of grains which are thereafter traversed through a second zone in which the heated air or gas is blown downwardly through the bed of grains and the conveyor belt; the reversal of the gas flow is preferred since when the grains reach the second zone, the loss in weight due to removal of moisture could result in the grains being blown off the conveyor belt if the stream of air or gas is in an upward direction.

Although the final heating stage is preferably effected by means of a stream of hot air or gas as just described, the heating can alternatively be effected by means of dielectric or infra-red heating.

When the moisture content of the grains has been reduced to substantially the normal moisture content of ordinary milled rice grains, which is usually 10 to 14% by weight, their moisture content is in substantial equilibrium and the rice grains can be stored in storage bins or packages until required for use. Before the grains are passed to storage or are packed, it is desirable that they should be cooled down to normal room temperature to avoid development of any undesirable rancidity and, therefore, in the preferred embodiment of the invention, the conveyor belt passes through yet a third zone in which cool air is blown downwardly through the bed of grains and the conveyor belt to cool the grains which may then be passed directly to storage or to a packaging device.

Although the preferred embodiment of the final stage has been indicated as being the use of a conveyor belt satisfactory results are obtainable by heating the rice grains on a tray and passing a current of air over the tray at an elevated temperature, for example, treating a ½" layer of grains having a moisture content of 26% by weight for from 2 to 4 minutes at a temperature of 110° C.

The density of the final product produced by the process of the invention when using medium milled rice grains is ordinarily between 0.65 and 0.75 gram per cc.

The following examples are given to illustrate several preferred embodiments of the invention.

*Example I*

2 kg. of medium grain rice (Ardizzone) were soaked in water having a temperature of 58° C. for 10 minutes, drained on a stainless-steel mesh tray and allowed to temper in air for one hour. The moisture content of the tempered rice was 24.3% by weight. The tempered rice was then subjected to radio-frequency heating in a 2.5 kw. Radyne type H15 heating unit at 36 mc./s., in batches of 500 g. on an area of 144 sq. ins., with a heat input of 1.5 kw. for 6 minutes. The final moisture content of the treated material was 11.0% by weight.

*Example II*

10 lbs. of rice were soaked in water at 58° C. for 10 minutes then centrifuged in batches of 3 lbs. in a 9″ Broadbent centrifuge for one minute at 1000 r.p.m. The centrifuged rice was then held in a closed bin for one hour to allow equalization of the moisture throughout the grains. The moisture content of the tempered material was 25.9% by weight.

The tempered rice was then heated in batches of 3 lbs. on 1 sq. ft. trays in a hot air drier where provision was made for reversal of the air flow. The inlet air temperature was 110° C., and the heating time 2 minutes with upward air flow and 2 minutes with downward air flow. The air velocity was 160 ft./min. After removal, the rice was cooled in a current of air. The final moisture content was 11.1% by weight.

*Example III*

Cleaned rice is fed by means of a vibratory feeder at a steady rate (variable up to 1000 lbs./hr.) into a conventional continuous blanching machine of stainless steel, the retention time being adjustable by a variable speed drive. The normal retention time is approximately 10 minutes, but this is adjusted so that the moisture content of the rice after tempering is between 24 to 27% by weight. The soaking water is heated by steam injection and thermostatically controlled at 55° C. After soaking, the rice passes through an Escher Wyss continuous centrifuge (type C1/4) of stainless steel construction, running at 450 r.p.m. and then tempered on an enclosed trough-belt conveyor so as to have a retention time of one hour. The tempered rice then passes to a continuous band dried with a 3 ft. wide perforated stainless steel slat conveyor, and is spread in an even layer. The drier is fitted with gas-fired indirect air heaters each thermostatically controlled. The drier is in three sections:

(i) Heated air section with upward air flow.
(ii) Heated section with downward air flow.
(iii) Cooling section with downward air flow.

The band speed is adjustable for variation of heating time. Air volume in each section can be adjusted between 600 and 2500 cu. ft./min. by variable speed drives on the fans.

An example of operating conditions:

| | |
|---|---|
| Rice feed rate | 500 lbs./hour. |
| 1st stage—inlet air temperature | 110° C. |
| 1st stage—outlet air temperature | 65° C. |
| 2nd stage—inlet air temperature | 93° C. |
| Retention time in each section | 1 min. 50 secs. |
| Bed depth | ¾″. |
| Air velocity through bed 1st stage | 160 ft./min. |
| Air velocity through bed 2nd stage | 140 ft./min. |
| Moisture content of tempered rice | 26.3% by weight. |
| Moisture content of finished rice | 13.0% by weight. |

While the present invention has been described by means of several preferred embodiments, it is to be understood that the invention is not to be limited thereto, reference being had to the appended claims for a full definition of the scope of the invention.

What is claimed is:

1. A process for the production of a modified rice in the form of grains which comprises contacting milled rice grains with water at a temperature below the gelatinization point of the starch in said grains for a period of 10–30 minutes to raise the moisture content uniformly throughout said grains to about 18 to 30% by weight and heating said rice grains at a temperature of 90°–120° C. while avoiding gelatinization of said rice to cause a rapid expulsion of moisture and a reduction in the moisture content of the grains to about 10–14% by weight, thereby effecting a modification in the structure of the grains.

2. A process for the production of a modified rice in the form of grains which comprises contacting milled rice grains with water at a temperature below the gelatinization point of the starch in said grains for a period of about 10 to 30 minutes to raise the moisture content uniformly throughout the grains to about 18 to 30% by weight, tempering said grains for 10 minutes to 4 hours at a temperature of 20° C. to 55° C. thereby permitting substantially uniform distribution of the moisture throughout the grains, removing excess surface water from said rice grains, and heating said rice grains at a temperature of 90°–120° C. for two to six minutes to cause a rapid expulsion of moisture and a reduction in the moisture content of the grains to about 10 to 14% by weight thereby effecting a modification in the structure of the grains.

3. The process according to claim 2 wherein the rice grains are tempered in air having a relative humidity of 80 to 90% for 10 minutes at a temperature of 55° C. to permit a substantially uniform distribution of the moisture throughout the grains.

4. A process for the production of a modified rice in the form of grains which comprises contacting milled rice grains with water at a temperature below the gelatinization point of the starch in said grains for a period of about 10 to 30 minutes to raise the moisture content uniformly throughout the grains to about 18 to 30% by weight, removing excess surface water from said rice grains, and drying said rice in a gaseous stream at a temperature of 90–120° C. for two to six minutes to reduce the moisture content to about 10 to 14%.

5. The process according to claim 4 wherein the rice grains are placed in a bed which is dried by being passed through a first zone having heated air blown upwardly through the grains, a second zone having heated air blown downwardly through the grains and then through a third zone in which the air is blown downwardly through the grains thereby cooling said grains to room temperature prior to storage.

References Cited in the file of this patent

UNITED STATES PATENTS

| | | |
|---|---|---|
| 2,438,939 | Ozai-Durrani | Apr. 6, 1948 |
| 2,696,156 | Campbell et al. | Dec. 7, 1954 |
| 2,696,157 | Campbell et al. | Dec. 7, 1954 |
| 2,696,158 | Shuman et al. | Dec. 7, 1954 |
| 2,715,579 | Roberts | Aug. 16, 1955 |
| 2,740,719 | Ozai-Durrani | Apr. 3, 1956 |